(12) United States Patent
Shigeta (10) Patent No.: US 11,033,802 B2
(45) Date of Patent: Jun. 15, 2021

(54) PLAYING CARD

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

(*) Notice: Subject to any disclaimer, the term of this patent is extended or adjusted under 35 U.S.C. 154(b) by 0 days.

(21) Appl. No.: 16/148,514

(22) Filed: Oct. 1, 2018

(65) Prior Publication Data
US 2019/0099656 A1    Apr. 4, 2019

(30) Foreign Application Priority Data

Oct. 2, 2017 (JP) .............................. JP2017-192634

(51) Int. Cl.
*A63F 1/02* (2006.01)
*A63F 1/18* (2006.01)
(Continued)

(52) U.S. Cl.
CPC ................ *A63F 1/02* (2013.01); *A63F 1/067* (2013.01); *A63F 1/18* (2013.01); *G07F 17/32* (2013.01);
(Continued)

(58) Field of Classification Search
CPC .................................. A63F 1/02; A63F 1/067
(Continued)

(56) References Cited

U.S. PATENT DOCUMENTS 821,781 A    5/1906  Cadwallader
1,745,373 A    2/1930  Landsberger
(Continued)

FOREIGN PATENT DOCUMENTS

AU    2012211456 A1    9/2012
CN       1473991 A      2/2004
(Continued)

OTHER PUBLICATIONS

International Search Report dated Dec. 18, 2018 issued in corresponding PCT Application PCT/JP2018/034761 cites the patent documents above.

(Continued)

*Primary Examiner* — John E Simms, Jr.
*Assistant Examiner* — Dolores R Collins
(74) *Attorney, Agent, or Firm* — Norton Rose Fulbright US LLP (57) ABSTRACT

The present disclosure relates to a playing card, where a suit and a rank are printed on one surface of a card base sheet, a back pattern is printed on a back surface, an intermediate layer having a black layer or a color layer similar to black is provided on the card base sheet to make transmission of visible rays difficult, and ink containing no carbon is used for printing the suit and the rank. The intermediate layer is configured to prevent transmission of visible rays from the back surface. The suit and the rank printed with the ink containing no carbon are configured to transmit infrared rays. The intermediate layer and the suit and rank printed with the ink containing no carbon are configured such that it is difficult for both the visible rays and the infrared rays to distinguish the suit and the rank from the back surface.

8 Claims, 9 Drawing Sheets

(51) Int. Cl.
*A63F 1/06* (2006.01)
*G07F 17/32* (2006.01)
*A63F 1/12* (2006.01)
*A63F 9/24* (2006.01)

(52) U.S. Cl.
CPC .......... *A63F 1/12* (2013.01); *A63F 2001/022* (2013.01); *A63F 2009/2419* (2013.01); *A63F 2250/58* (2013.01)

(58) Field of Classification Search
USPC ................................................ 273/292, 295
See application file for complete search history.

(56) References Cited

U.S. PATENT DOCUMENTS

| | | | |
|---|---|---|---|
| 1,805,761 A | 5/1931 | De Pamphilis | |
| 1,887,203 A | 11/1932 | Hoke | |
| 2,193,638 A | 2/1938 | Morton | |
| 2,360,973 A | 3/1943 | Pedersen | |
| 3,814,436 A | 6/1974 | Boren | |
| 3,905,434 A | 9/1975 | Lewandowski et al. | |
| 3,939,621 A | 2/1976 | Giori | |
| 3,955,337 A | 5/1976 | Bleich | |
| 4,124,290 A | 11/1978 | Axelrod et al. | |
| 4,170,358 A | 10/1979 | Hancock | |
| 4,203,334 A | 5/1980 | Zettler | |
| 4,398,708 A | 8/1983 | Goldman et al. | |
| 4,534,562 A | 8/1985 | Cuff et al. | |
| 4,558,557 A | 12/1985 | Kuehfuss | |
| 4,617,216 A * | 10/1986 | Haghiri-Tehrani | G06K 19/07728 428/67 |
| 4,779,401 A | 10/1988 | Pedersen | |
| 4,817,528 A | 4/1989 | Baker | |
| 4,861,031 A * | 8/1989 | Simms | A63F 1/00 273/295 |
| 4,889,367 A | 12/1989 | Miller | |
| 4,955,619 A | 9/1990 | Christman | |
| 5,067,713 A | 11/1991 | Soules et al. | |
| 5,169,155 A * | 12/1992 | Soules | A63F 1/02 156/277 |
| 5,259,907 A * | 11/1993 | Soules | A63F 1/02 156/277 |
| 5,374,061 A * | 12/1994 | Albrecht | A63F 1/14 273/149 R |
| 5,522,623 A * | 6/1996 | Soules | A63F 1/14 283/88 |
| 5,529,309 A * | 6/1996 | Bartlett | A63F 3/00157 273/292 |
| 5,779,546 A * | 7/1998 | Meissner | A63F 1/14 273/148 A |
| 5,949,050 A * | 9/1999 | Fosbenner | G09F 9/375 235/449 |
| 5,957,458 A * | 9/1999 | Haas | A63F 3/0685 273/139 |
| 5,997,044 A * | 12/1999 | Behm | A63F 3/0665 283/100 |
| 6,017,035 A | 1/2000 | Glasser et al. | |
| 6,145,838 A * | 11/2000 | White | A63F 1/02 273/293 |
| 6,547,247 B2 * | 4/2003 | Hoyt | A63F 1/00 273/236 |
| 6,695,313 B1 | 2/2004 | Blane | |
| 6,722,654 B1 | 4/2004 | Johnson et al. | |
| 7,029,009 B2 * | 4/2006 | Grauzer | A63F 1/14 273/149 P |
| 7,029,281 B1 | 4/2006 | Rathyen | |
| 7,156,398 B1 | 1/2007 | Phillips | |
| 7,229,720 B2 * | 6/2007 | Hamada | G03H 1/202 283/86 |
| 7,374,170 B2 * | 5/2008 | Grauzer | A63F 1/14 273/149 R |
| 7,510,194 B2 * | 3/2009 | Soltys | A63F 1/02 273/149 R |
| 7,575,234 B2 * | 8/2009 | Soltys | A63F 1/18 273/149 R |
| 7,769,232 B2 * | 8/2010 | Downs, III | A63F 1/14 273/148 A |
| 7,775,524 B2 * | 8/2010 | Lutnick | A63F 1/00 273/292 |
| 7,933,448 B2 * | 4/2011 | Downs, III | A63F 1/14 273/148 A |
| 8,057,296 B2 | 11/2011 | Hedrick et al. | |
| 8,083,883 B2 * | 12/2011 | Tenyer | B32B 7/12 156/182 |
| 8,197,334 B2 | 6/2012 | Chudd et al. | |
| 8,235,825 B2 | 8/2012 | French | |
| 8,287,346 B2 | 10/2012 | Miller | |
| 8,333,654 B2 | 12/2012 | Amour | |
| 8,371,583 B2 * | 2/2013 | Shigeta | A63F 1/02 273/149 R |
| 8,371,593 B2 | 2/2013 | Michel et al. | |
| 8,382,115 B2 | 2/2013 | Moody | |
| 8,387,983 B2 * | 3/2013 | Shigeta | A63F 1/10 273/149 R |
| 8,419,535 B2 * | 4/2013 | Miller | A63F 1/12 463/16 |
| 8,500,349 B2 | 8/2013 | Meyerhofer et al. | |
| 9,162,138 B2 * | 10/2015 | Grauzer | A63F 1/14 |
| 9,314,689 B2 | 4/2016 | Chun | |
| 9,457,262 B2 | 10/2016 | Shigeta | |
| 9,471,867 B2 | 10/2016 | Droz | |
| 9,616,323 B2 * | 4/2017 | Gilson | A63F 1/00 |
| 9,855,491 B2 * | 1/2018 | Shigeta | A63F 1/02 |
| 9,914,044 B2 | 3/2018 | Shigeta | |
| 9,950,245 B2 * | 4/2018 | Yang | A63F 1/00 |
| 10,610,766 B2 | 4/2020 | Shigeta | |
| 2002/0142820 A1 * | 10/2002 | Bartlett | A63F 1/18 463/11 |
| 2005/0093229 A1 | 5/2005 | Dewayne et al. | |
| 2007/0145734 A1 | 6/2007 | Wen et al. | |
| 2007/0187054 A1 | 8/2007 | Koike | |
| 2009/0212499 A1 * | 8/2009 | Scarborough | A63F 1/02 273/295 |
| 2009/0236804 A1 * | 9/2009 | Kirsch | A63F 1/02 273/295 |
| 2010/0314834 A1 * | 12/2010 | Shigeta | A63F 1/10 273/293 |
| 2010/0327525 A1 * | 12/2010 | Shigeta | A63F 1/02 273/149 R |
| 2012/0274026 A1 * | 11/2012 | Dodds | A63F 1/02 273/295 |
| 2013/0287986 A1 | 10/2013 | Yamamuro et al. | |
| 2013/0337922 A1 | 12/2013 | Kuhn et al. | |
| 2014/0151962 A1 | 6/2014 | Hoyt et al. | |
| 2015/0151188 A1 * | 6/2015 | Hoyt | A63F 1/00 273/292 |
| 2015/0321079 A1 | 11/2015 | Abraham | |
| 2016/0107472 A1 | 4/2016 | Garcia Juez et al. | |
| 2016/0108581 A1 | 4/2016 | Olmos et al. | |
| 2017/0361211 A1 | 12/2017 | Gaynor et al. | |
| 2020/0261787 A1 | 8/2020 | Shigeta | |

FOREIGN PATENT DOCUMENTS

| | | |
|---|---|---|
| CN | 201082942 Y | 7/2008 |
| CN | 201295522 Y * | 8/2009 |
| CN | 101873880 A | 10/2010 |
| JP | 2003-302519 A | 10/2003 |
| JP | 2003347030 A | 12/2003 |
| JP | 2005264074 A | 9/2005 |
| JP | 2006-347030 A | 12/2006 |
| JP | 2008266834 A | 11/2008 |
| JP | 2016093458 A | 5/2016 |

(56) References Cited

FOREIGN PATENT DOCUMENTS

KR          100919841 B1    9/2009
WO          2009/069708 A1  6/2009

OTHER PUBLICATIONS

Japanese Office Action dated Jul. 16, 2019 issued in corresponding JP Application 2018174464 cites the patent documents above.
Macao Office Action dated Aug. 8, 2019 issued in corresponding MO Application I/1582 cites the patent documents above.
Examination Report No. 2 dated Dec. 5, 2019 for corresponding AU Application No. 2018236893.
Korean Office Action dated Jun. 25, 2020 issued in corresponding KR Application 10-2018-0117059 cites the patent documents above.
U.S. Office Action dated Oct. 26, 2020 issued in U.S. Appl. No. 16/652,741.
JP Allowance dated Dec. 1, 2020 issued in JP Application JP2018-174464.
Korean Allowance dated Mar. 29, 2021 issued in KR Application 10-2018-0117059.

* cited by examiner

| SHUFFLED PLAYING CARD ID | SHUFFLE DATE | SHUFFLE MACHINE ID | SHEET ID | PRINTING DATE | CUT DATE |
|---|---|---|---|---|---|
| AB0004 | 20170901 | 50021 | 00001 | 20170801 | 20170803 |
| | | | 00002 | 20170801 | 20170804 |
| | | | 00003 | 20170801 | 20170804 |
| AB0005 | 20170901 | 500022 | 00004 | 20170801 | 20170804 |
| | | | 00005 | 20170801 | 20170804 |
| | | | 00006 | 20170802 | 20170804 |
| | | | 00007 | 20170802 | 20170804 |
| | | | 00009 | 20170802 | 20170805 |
| ... | ... | ... | ... | ... | ... |

PLAYING CARD

CROSS REFERENCE TO RELATED APPLICATIONS

The present application claims priority to JP Application No. 2017-192634 filed Oct. 2, 2017; the disclosure of which is incorporated herein by reference.

BACKGROUND

Technical Field

The present invention relates to a playing card.

Related Art

In various playing card games such as poker, baccarat, bridge, and blackjack, a dealer sets playing cards of one deck or a plurality of decks on a card shooter and the like, delivers the playing cards one by one from the card shooter, and distributes the playing cards to a game participant. At this time, in order to guarantee fairness of the game, these cards need to be distributed randomly, so a game sponsor needs to sufficiently shuffle the playing cards randomly before setting the playing cards on the card shooter.

However, when the game sponsor performs shuffling prior to the game, it may take a long time to shuffle cards, which is a factor of hindering an efficient operation of a game. In addition, when the game sponsor performs shuffling, there is a problem in that there is room to perform fraudulent acts such as inserting and removing cards and replacing cards.

In order to solve such a problem, WO 2009/069708 A discloses shuffled playing cards individually packaged in a state in which playing cards constituting a predetermined number of decks are shuffled. In the packaging of the shuffled playing card, a shuffled playing card ID for accessing information, which can specify a shuffle machine or a shuffle machine group shuffling the shuffled playing card, on database is assigned as an ID code.

Originally, in a printing industry, it is essential to use a carbon black ink in addition to three primary colors, in order to express sharper and darker black in a black part. Naturally, even in the case of the playing card, it is common sense to normally print the black part with the carbon black ink.

SUMMARY

Carbon has characteristics that infrared emissivity (absorption ratio) is high, so the carbon black ink will appear black when viewed through an infrared camera.

In recent years, ultra-miniaturization and high performance of electronic devices have been advanced, and even the infrared camera with good performance can be made ultra-miniaturized by malicious fraudulent players, so that there is a risk that the camera will be brought from the outside into a game hall without being noticed.

When a normal playing card is viewed through an infrared camera with good performance, a printed part on a front side to which the carbon black ink is applied can be seen even from a back side of the playing card. That is, there is a possibility to identify ranks and suits on the front side when viewed from the back side.

An object of the present invention is to provide a playing card capable of making it difficult to see through a printed part on a front side even when the playing card is viewed through an infrared camera.

There is provided a playing card according to an aspect of the present invention, wherein a suit and a rank are printed on one surface of a card base sheet, and a back pattern is printed on a back surface of the card base sheet, the card base sheet has an infrared seeing-through preventing layer containing carbon as an intermediate layer, and an ink containing no carbon is used to print the suit and the rank, and one set or a plurality of sets of decks are formed by individual cards cut by a cutting machine from the card base sheet.

According to this aspect, since the card base sheet is provided with an infrared seeing-through preventing layer containing the carbon as the intermediate layer, infrared rays radiated from the printed part on the front side of the card are absorbed by the intermediate layer, and hardly transmit the back side of the card. In addition, since the ink containing no carbon is used to print the suit and the rank, a difference between intensity of infrared rays radiated from the printed part and intensity of infrared rays radiated from an area therearound is small. Thus, it is extremely difficult to distinguish the suit and the rank from a distribution of a trace amount of transmitted infrared rays even if there are the infrared rays radiated from the printed part on the front side and the infrared rays transmitting the back side of the card without being absorbed by the intermediate layer. Therefore, it is possible to provide a playing card capable of making it difficult to see through the printed part on the front side even when the playing card is viewed through the infrared camera.

In the playing card according to the aspect of the present invention, the back pattern on the back surface of the card base sheet may be printed with an ink containing carbon.

According to the aspect, since the back pattern of the card is printed with an ink containing carbon, the infrared distribution having the same pattern as the back pattern appears on the back side of the card. Therefore, even if there are the infrared rays radiated from the printed part on the front side and the infrared rays transmitting the back side of the card without being absorbed by the intermediate layer, the distribution of the trace amount of transmitted infrared rays is buried by overlapping the distribution of the infrared rays radiated from the back pattern of the card, so it is even more difficult to distinguish the printed part on the front side of the card even when the playing card is viewed through the infrared camera.

There is provided a playing card according to an aspect of the present invention, wherein a suit and a rank are printed on one surface of a card base sheet, and a back pattern is printed on a back surface, the card base sheet has an infrared seeing-through preventing layer containing carbon as an intermediate layer, the back pattern on the back side of the card base sheet may be printed with the ink containing carbon, and one set or a plurality of sets of decks are formed by individual cards cut by a cutting machine from the card base sheet.

According to this aspect, since the card base sheet is provided with the infrared seeing-through preventing layer containing the carbon as the intermediate layer, infrared rays radiated from the front side of the card are absorbed by the intermediate layer, and hardly transmit the back side of the card. In addition, since the back pattern of the card is printed with the ink containing carbon, the distribution of the infrared rays having the same pattern as the back pattern appears on the back side of the card. Therefore, even if there are the infrared rays radiated from the printed part on the front side and the infrared rays transmitting the back side of the card without being absorbed by the intermediate layer, the distribution of the trace amount of transmitted infrared rays is buried by overlapping the distribution of the infrared rays radiated from the back pattern of the card, so it is extremely difficult to distinguish the suit and the rank from the distribution of the infrared rays. Therefore, it is possible to provide a playing card capable of making it difficult to see through the printed part on the front side even when the playing card is viewed through the infrared camera.

There is provided a playing card according to an aspect of the present invention, wherein a suit and a rank are printed on one surface of a card base sheet, and a back pattern is printed on a back surface, an ink containing no carbon is used to print the suit and the rank, the back pattern on the back surface of the card base sheet may be printed with the ink containing carbon, and one set or a plurality of sets of decks are formed by individual cards cut by a cutting machine from the card base sheet.

According to the aspect, since the ink containing no carbon is used to print the suit and the rank, a difference between intensity of infrared rays radiated from the printed part and intensity of infrared rays radiated from an area therearound is small. Thus, it is extremely difficult to distinguish the suit and the rank from a distribution of a trace amount of transmitted infrared rays even if there are the infrared rays radiated from the printed part on the front side of the card and the infrared rays transmitting the back side of the card. In addition, since the back pattern of the card is printed with the ink containing carbon, the distinct uneven distribution of the infrared rays having the same pattern as the back pattern appears on the back side of the card. Therefore, even if there are the infrared rays radiated from the printed part on the front side and the infrared rays transmitting the back side, the distribution of the trace amount of transmitted infrared rays is buried by overlapping the distribution of the infrared rays radiated from the back pattern of the card, so it is extremely difficult to distinguish the suit and the rank from the distribution of the infrared rays. Therefore, it is possible to provide a playing card capable of making it difficult to see through the printed part on the front side even when the playing card is viewed through the infrared camera.

There is provided a shuffled playing card according to an aspect of the present invention, wherein a predetermined sets of playing cards having any of the above-described characteristics are shuffled by a shuffle machine to form a set of shuffled playing cards, and the set of shuffled playing cards is individually packaged and sealed.

According to the aspect, it is possible to provide a shuffled playing card which need not be shuffled by a game sponsor over a long period of time prior to a game and does not provide any room to perform fraudulent acts such as inserting and removing cards and replacing cards.

In the shuffled playing card according to the aspect of the present invention, individually different shuffled playing card IDs may be assigned to the shuffled playing card individually packaged and sealed as ID codes.

According to the aspect, for example, if the shuffled playing card ID is associated with information that can specify the shuffle machine or a shuffle machine group shuffling the shuffled playing card, the shuffled playing card ID is assigned to the shuffled playing card individually packaged and sealed, and thus when it is conceived that there is any defect in the playing card and the shuffle machine is a cause of the defect, it is possible for a manufacturer to easily specify in which shuffle machine or shuffle machine group the defect occurs, thereby making it possible to take countermeasures as soon as possible.

In the playing card according to the aspect of the present invention, the different sheet IDs for one card base sheet or each of the plurality of card base sheets may be printed on the card base sheet, and the sheet ID may be printed on a print surface of the card constituting the set of decks.

According to this aspect, since the card base sheet on which the different sheet IDs are printed for one card base sheet or each of the plurality of card base sheets is cut to produce the playing card of one deck or a plurality of decks, it is possible to confirm, on the database, the information on when the card is printed and also when the card is inspected by tracing back through the distribution history of the playing card. As a result, it is possible to confirm whether the playing card is a genuine product correctly manufactured and distributed by reading the sheet ID from the contents of the card to confirm the history on the database even if the contents of the packaged shuffled playing card are replaced with a set of cards whose arrangement is known by malicious fraudulent players.

In the playing card according to the aspect of the present invention, the different sheet IDs for one card base sheet or each of the plurality of card base sheets may be printed on the card base sheet, and the sheet ID may be printed on a card other than the card constituting the set of decks.

In a shuffled playing card according to the aspect of the present invention, the different sheet IDs for one card base sheet or each of the plurality of card base sheets may be printed on the card base sheet, the sheet ID may be printed on a print surface of the card constituting the set of decks, individually different shuffled playing card IDs are assigned to the shuffled playing card individually packaged and sealed as ID codes, and the sheet IDs of the predetermined sets of cards constituting the shuffled playing cards and the shuffled playing card IDs assigned to the shuffled playing cards may be associated with each other in database.

There is provided a playing card according to an aspect of the present invention, wherein a suit and a rank are printed on one surface of a card base sheet, a back pattern is printed on a back surface, an intermediate layer having a black layer or a color layer similar to black is provided on the card base sheet to make transmission of visible rays difficult, and an ink containing no carbon is used for printing the suit and the rank printing, and thus the intermediate layer prevents the transmission of the visible rays from the back surface and the suit and the rank printed with the ink containing no carbon transmit infrared rays, such that it is difficult for both the visible rays and the infrared rays to distinguish the suit and the rank from the back surface, and one set or a plurality of sets of decks are constituted by individual cards cut from the card base sheet by a cutting machine.

In the playing card according to the aspect of the present invention, the back pattern of the card base sheet may be printed with an ink containing carbon to allow the ink containing carbon of the back pattern to prevent the transmission of the infrared rays from the back surface.

In the playing card according to the aspect of the present invention, the intermediate layer may prevent the infrared rays including the carbon from seeing-through.

There is provided a shuffled playing card according to an aspect of the present invention, wherein predetermined sets of the playing cards having any one of the above characteristics may be shuffled by a shuffle machine to form a set of shuffled playing cards.

In the shuffled playing card according to an aspect of the present invention, individually different shuffled playing card IDs may be assigned to the shuffled playing cards as ID codes.

A table game system according to an aspect of the present invention includes: a playing card having one surface on which a suit and a rank are printed; a game table which performs a game using the playing card; and a card distribution device which withdraws the playing card in the game table sheet by sheet, wherein the playing card is printed with the suit and the rank with an ink containing no carbon, and codes indicating the suit and the rank are printed with an invisible ink, and the card distribution device has a function of allowing the code printed with the invisible ink to read the rank and determining and displaying win or loss results of each game based on the information of the rank.

DETAILED DESCRIPTION

Hereinafter, embodiments of the present invention will be described in detail with reference to the accompanying drawings. In the respective drawings, constituent elements having equivalent functions are denoted by the same reference numerals, and the detailed description of the constituent elements denoted by the same reference numerals is not repeated.

The table game system according to one embodiment includes a playing card 2 having a suit 21a and a rank 21b printed on one surface thereof (see FIG. 1), a game table which plays a game using the playing card 2, and a card distribution device which withdraws the playing card 2 in the game table sheet by sheet.

Figure 1:
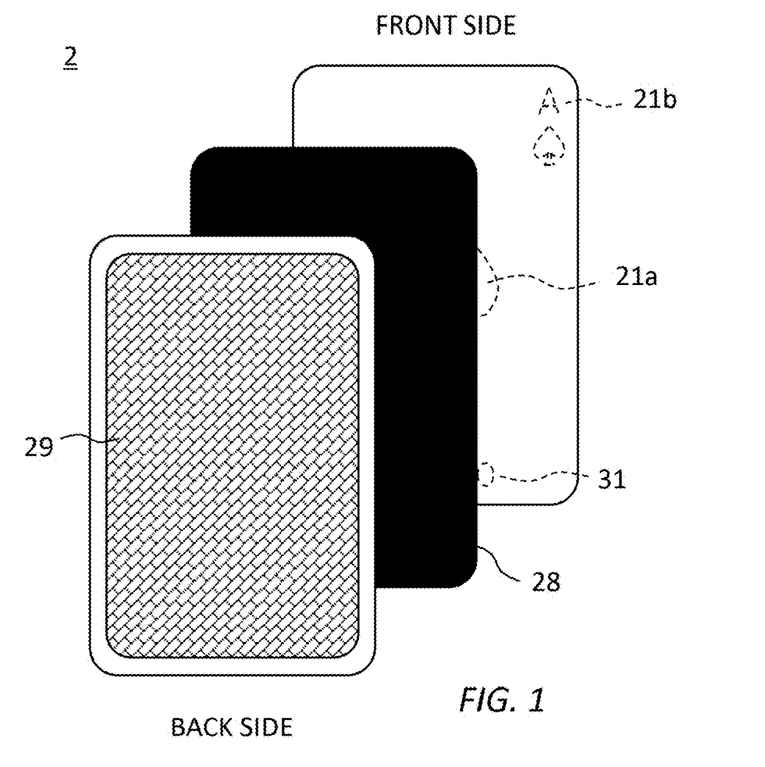
FIG. 1 is an exploded view of a playing card according to one embodiment.

As will be described later, the suit 21a and the rank 21b are printed on the playing card 2 with ink containing no carbon. In addition, the playing card 2 is printed with a code indicating the suit 21a and the rank 21b with invisible ink (for example, ultraviolet light emitting ink which emits light by irradiation of ultraviolet light or DNA containing paint which emits light having a specific wavelength with respect to light).

The card distribution device has a function of allowing the code or the rank printed with the invisible ink to read and determining and displaying win or loss results of each game based on the information of the rank. As the card distribution device, for example, a card shooter device described in WO 2012/053179 A or a card shooter device described in WO 2013/161284 A can be used.

Figure 2:
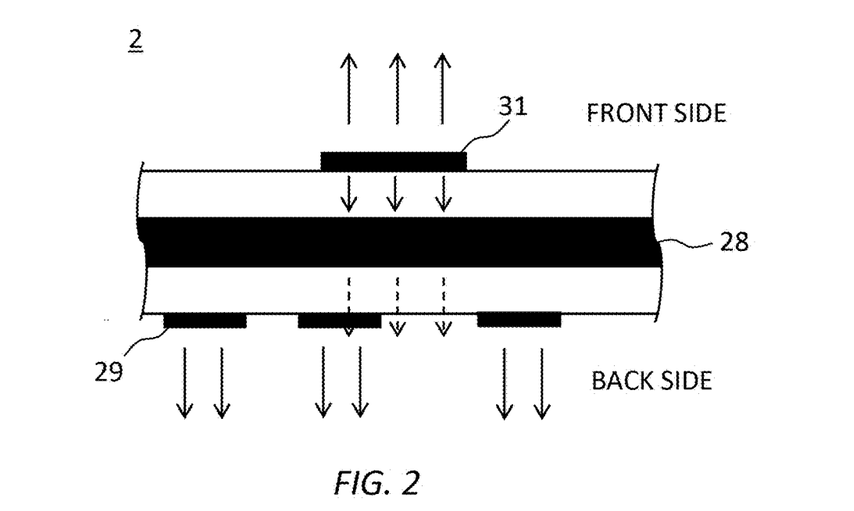
FIG. 2 is an enlarged view of a part of a cross section of the playing card shown in FIG. 1.

Next, the structure of the playing card 2 according to one embodiment will be described. FIG. 1 is an exploded view of a playing card 2 according to one embodiment. FIG. 2 is an enlarged view of a part of a cross section of the playing card 2 shown in FIG. 1.

As shown in FIGS. 1 and 2, the playing card 2 according to the present embodiment has the suit 21a and the rank 21b printed on one surface thereof, a back pattern 29 printed on the back surface thereof, and an infrared seeing-through preventing layer 28 as an intermediate layer.

In the present embodiment, the infrared seeing-through preventing layer 28 as the intermediate layer contains carbon. Since the carbon has characteristics that infrared emissivity (absorption ratio) is high, as shown in FIG. 2, the infrared rays irradiated from the printed part (for example, sheet ID 31 to be described later) of the front surface of the card are absorbed by the infrared seeing-through preventing layer 28 as the intermediate layer and hardly transmit the back side of the card. In the present specification, the term "visible ray" means radiation that can enter the eyes and generate visual sensation and the term "infrared ray" means radiation which has a wavelength of a monochromatic light component longer than that of visible radiation (visible rays) and shorter than about 1 nm, which are based on the definition of JIS Z 8120: 2001.

The infrared seeing-through preventing layer 28 is not limited to an aspect including a material such as carbon which absorbs infrared rays as long as it can prevent the transmission of infrared rays. For example, the infrared seeing-through preventing layer 28 may be an aspect including a material such as aluminum foil which reflects infrared rays.

In the playing card 2 according to the present embodiment, ink containing no carbon is used for the printed part of the suit 21a and the rank 21b. The use of the ink containing no carbon is out of common sense, but since a jet black is not required for the rank and the suit or the pattern of the playing card, there is no problem even if the ink containing no carbon is used. Since the ink containing no carbon is used for the printed part of the suit 21a and the rank 21b, the difference between intensity of infrared rays radiated from the printed parts 21a and 21b and intensity of infrared rays radiated from an area therearound is small.

Thus, it is extremely difficult to distinguish shapes of the suit 21a and the rank 21b from a distribution of a trace amount of transmitted infrared rays even if there are the infrared rays radiated from the printed parts 21a and 21b on the front side of the card and the infrared rays transmitting the back side of the card without being absorbed by the intermediate layer 28.

In the playing card 2 according to the present embodiment, the back pattern 29 of the card is printed with the ink containing carbon (for example, carbon black ink). For this reason, as shown in FIG. 2, the distribution of the infrared rays having the same pattern as the back pattern 29 appears on the back side of the card. Therefore, even if there are the infrared rays radiated from the printed part (for example, sheet ID 31) on the front side and the infrared rays transmitting the back side of the card without being absorbed by the intermediate layer 28, the distribution of the trace amount of transmitted infrared rays is buried by overlapping the distribution of the infrared rays radiated from the back pattern 29 of the card, so it is even more difficult to distinguish the printed part 31 on the front side of the card even when the playing card is viewed through the infrared camera.

Figure 3A:
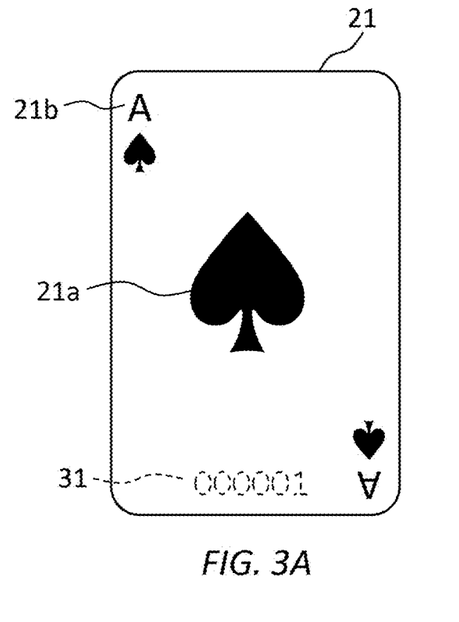
FIG. 3A is a diagram showing a front surface of a card constituting a set of decks among playing cards according to one embodiment.
Figure 3B:
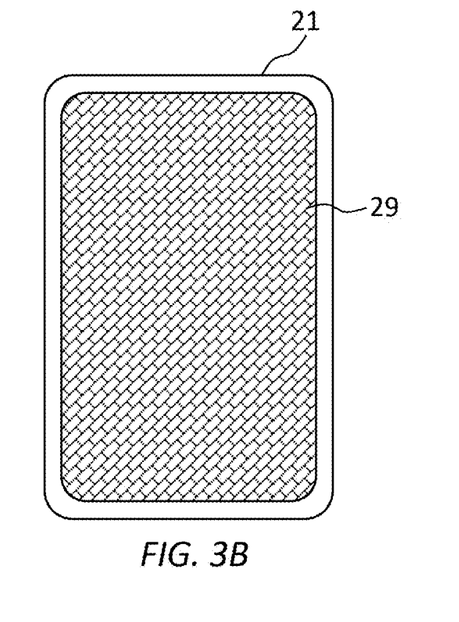
FIG. 3B is a diagram showing a back surface of the card.
Figure 4A:
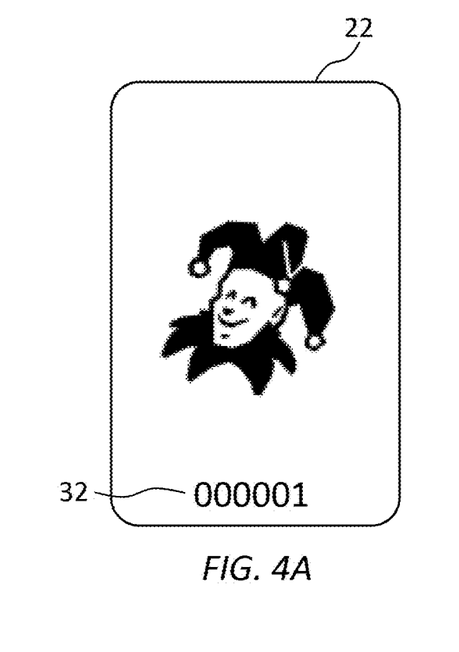
FIG. 4A is a diagram showing a front surface of a card other than the card constituting a set of decks among playing cards according to one embodiment.

FIG. 3A is a diagram showing the front surface of the card 21 constituting a set of decks among playing cards 2 according to one embodiment, and FIG. 3B is a diagram showing the back surface of the card. FIG. 4A is a diagram showing a front surface of a card 22 other than the card constituting a set of decks among the playing cards 2 according to one embodiment, and FIG. 4B is a diagram showing a back surface of the card.

As shown in FIGS. 3A and 3B, a set of playing cards 2 according to the present embodiment has 4×13=52 cards which are constituted by a combination of four suits 21a (that is, spade, club, diamond, and heart) and 13 ranks 21b (that is, ace (A), 2, 3, 4, 5, 6, 7, 8, 9, 10, jack (J), queen (Q), and king (K)) as a card 21 constituting a set of decks.

Figure 4B:
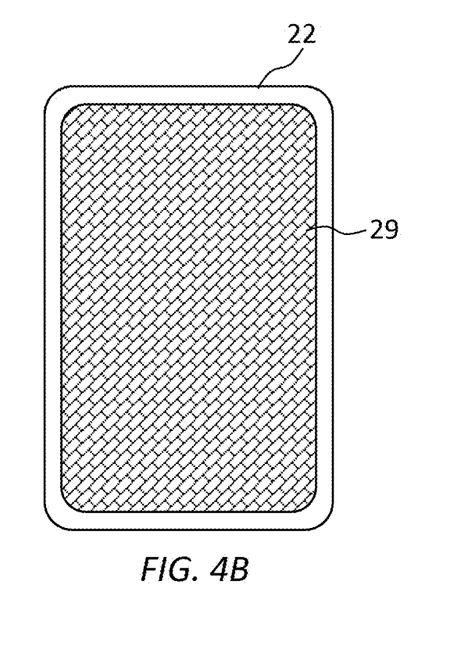
FIG. 4B is a diagram showing a back surface of the card.

In addition, as shown in FIGS. 4A and 4B, the set of playing cards 2 according to the present embodiment further has a "joker" card 22 as a card other than the cards constituting the set of decks. The "joker" card 22 included in one set of playing cards 2 may be one sheet or two sheets. The "joker" card 22 is a card which is removed and discarded before a shuffling process at the time of producing a shuffled playing card to be described later.

The set of playing cards 21 and 22 according to the present embodiment are formed by being individually cut from one card base sheet 20 (see FIG. 6) by a cutting machine.

As shown in FIGS. 3A and 3B and FIGS. 4A and 4B, common sheet IDs 31 and 32 are printed on front surfaces of each of the set of playing cards 21 and 22, and a common back pattern 29 is printed on a back side thereof. The sheet IDs 31 and 32 may be a character code including a plurality of figures, alphabets, or symbols, or may be a bar code or a two-dimensional code in which the character code is encoded.

As shown in FIGS. 3A and 3B, the sheet ID 31 printed on the card 21 constituting the set of decks may be printed with ink (for example, transparent UV ink) invisible to human eyes, or may be printed with ink (for example, black ink) visible to human eyes. When the sheet ID 31 is printed with ink (for example, transparent UV ink) invisible to human eyes, the appearance becomes similar to that of the conventional card, and thus a user of the card can use the card without feeling uncomfortable. On the other hand, when the sheet ID 31 is printed with ink (for example, black ink) visible to the human eyes, although there is a possibility that the user of the card may feel uncomfortable, the sheet ID 31 is simply an ID code, and therefore it does not cause special problems in the game.

In addition, as shown in FIGS. 4A and 4B, the sheet ID 32 printed on a card 22 other than the card constituting the set of decks may be printed with ink (for example, transparent UV ink) invisible to human eyes, or may be printed with ink (for example, black ink) visible to human eyes. When the card printed with ink (for example, black ink) visible to human eyes, a manufacturer can easily confirm the sheet ID 32 in the manufacturing process to be described later when inspecting quality of the printed card base sheet.

Figure 10:
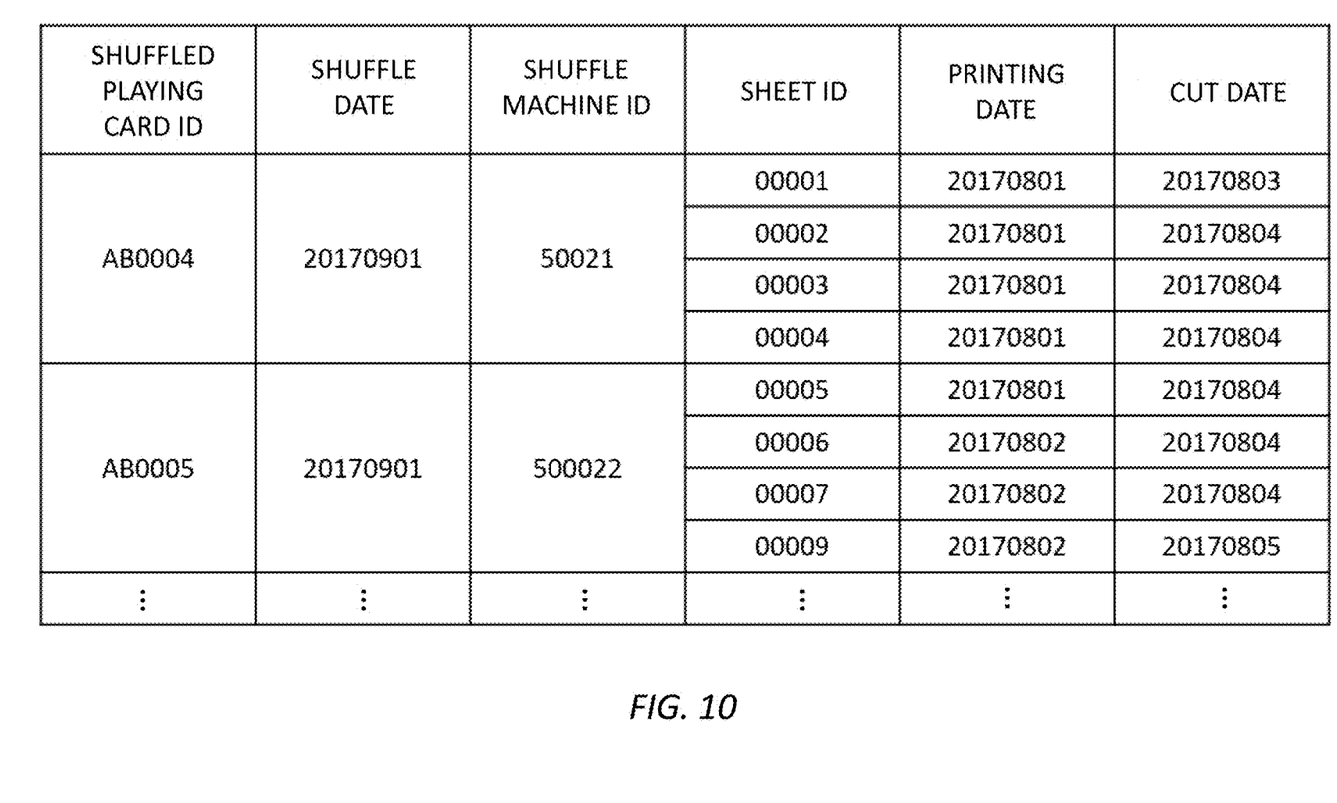
FIG. 10 is a diagram for describing database that stores the shuffled playing card ID and the sheet ID by associating the shuffled playing card ID with the sheet ID.

As shown in FIG. 10, the sheet IDs 31 and 32 printed on the respective playing cards 21 and 22 are stored in the database in association with one or both of recording of a printing date of the sheet ID on the original card base sheet 20 and recording of a cut date on the individual playing cards 21 and 22.

Figure 7:
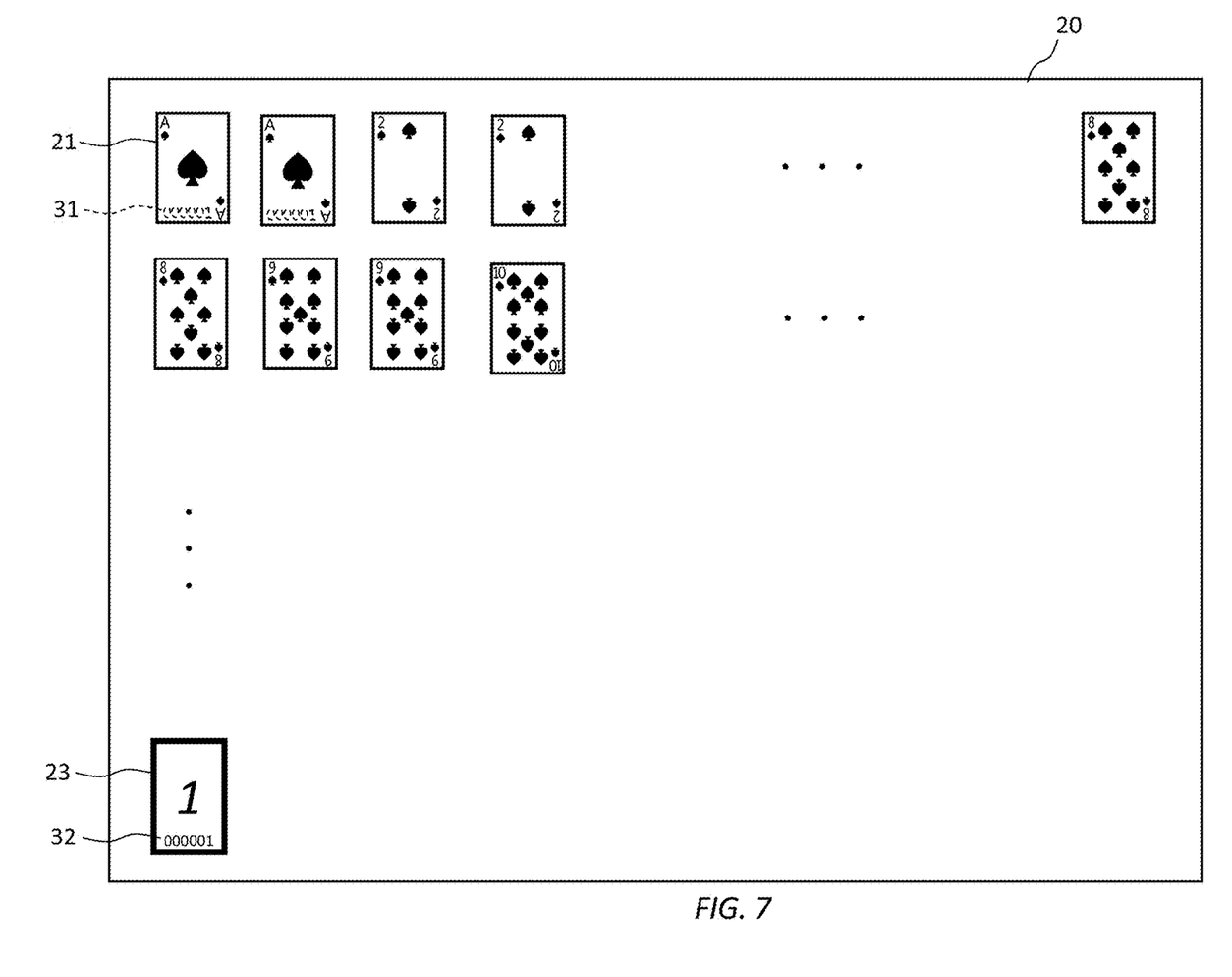
FIG. 7 is a diagram showing a card base sheet used in the method of manufacturing a playing card according to one embodiment, and is a diagram showing a modification of a card base sheet on which a sheet ID is printed.
Figure 8:
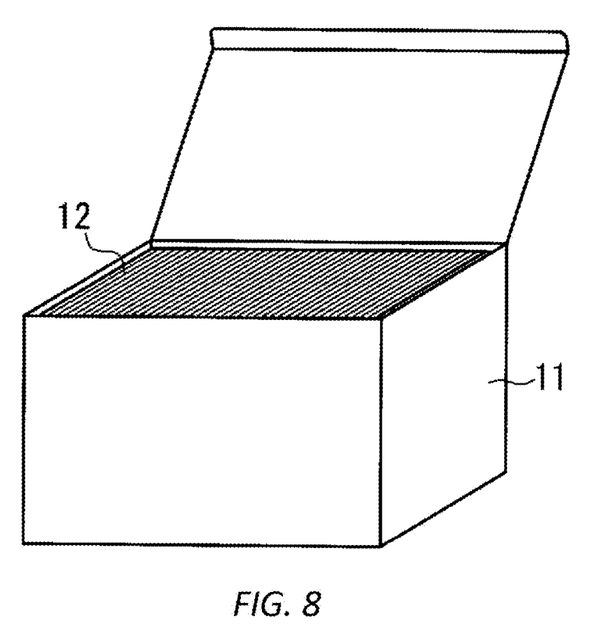
FIG. 8 is a diagram showing a shuffled playing card manufactured by the method of manufacturing a playing card according to one embodiment, and is a diagram showing the shuffled playing card before a lid of a package is sealed with a seal.
Figure 9:
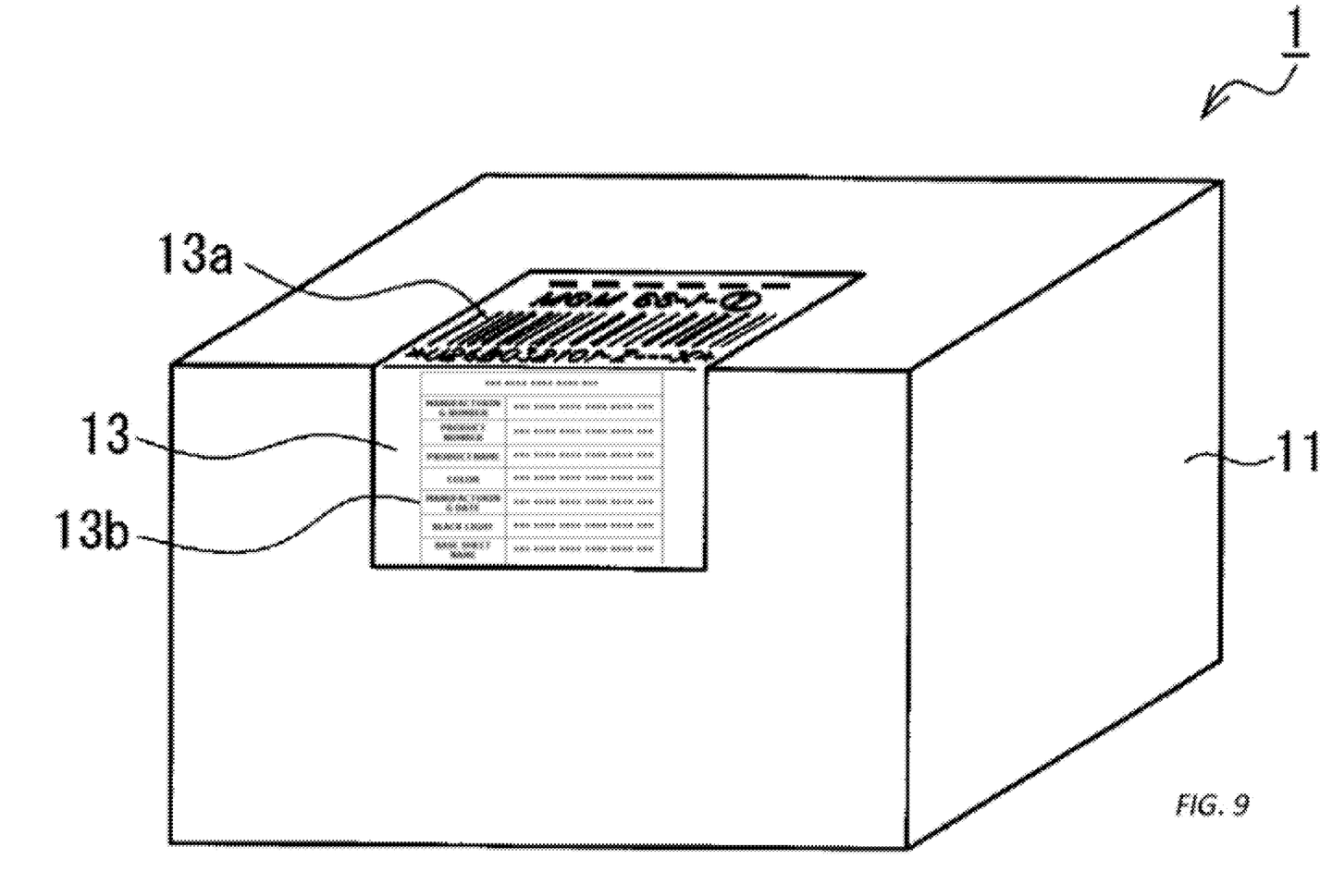
FIG. 9 is a diagram showing the shuffled playing card according to one embodiment, and is a diagram showing the shuffled playing card in which a shuffled playing card ID is assigned to the seal for sealing the lid of the package.

FIG. 8 is a diagram showing a shuffled playing card 12 according to the present embodiment, and is a diagram showing the shuffled playing card 12 before a package 11 is sealed with a seal 13. FIG. 7 is a diagram showing the shuffled playing card 12 according to the present embodiment, and is a diagram showing the shuffled playing card 12 in which a shuffled playing card ID 13a is assigned to the seal 13 for sealing the package 11.

The shuffled playing card 12 according to the present embodiment is a card in which a plurality of decks (for example, four decks or eight decks) of the card 21 constituting the deck among the above-described playing cards 2 are one set, and is sufficiently shuffled by a shuffle machine. In the shuffled playing card 12, different shuffled playing card IDs 13a are assigned as ID codes for each set. In the shown example, the shuffled playing card 12 is housed in a box-shaped package 11 and a lid thereof is sealed with a seal 13. The shuffled playing card ID 13a is encoded as a bar code and printed on the seal 13 which seals the package 11.

As shown in FIG. 8, the sheet ID 31 of the playing card 21 constituting the shuffled playing card 12 and the shuffled playing card ID 13a are stored in the database in association with each other. In addition, in the example shown in FIG. 10, the shuffled playing card ID 13a and a shuffle machine ID and a shuffle date which specify a shuffle machine or a shuffle machine group shuffling the shuffled playing card 12 are stored in database in association with each other.

Figure 5:
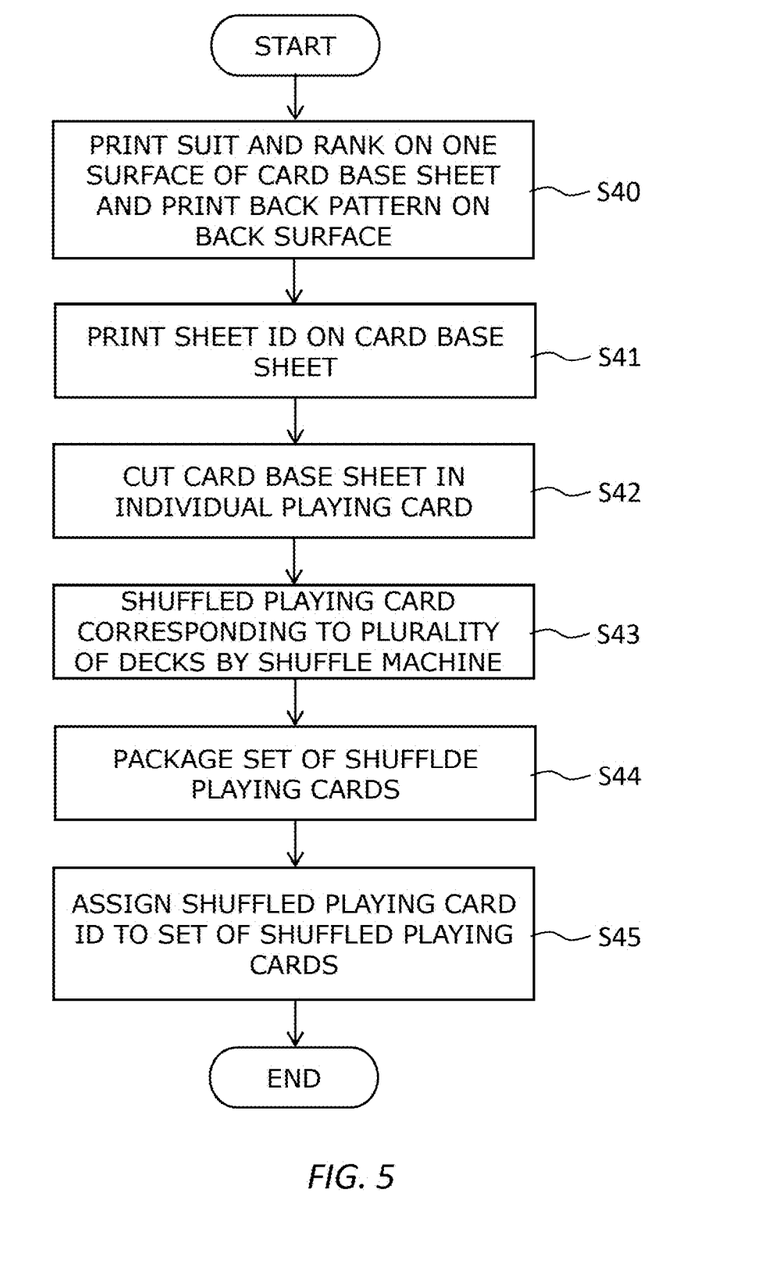
FIG. 5 is a flowchart for describing a method of manufacturing a playing card according to one embodiment.

Next, a method of manufacturing a playing card 2 and a shuffled playing card 12 according to the present embodiment will be described. FIG. 5 is a flowchart showing a method of manufacturing a playing card 2 and a shuffled playing card 12 according to the present embodiment.

In the manufacturing process of the playing card 2 and the shuffled playing card 12 according to the present embodiment, it is preferable for a process management system to consistently perform process management from order to shipment. In the present embodiment, a manufacturing method using such a process management system will be described.

Figure 6:
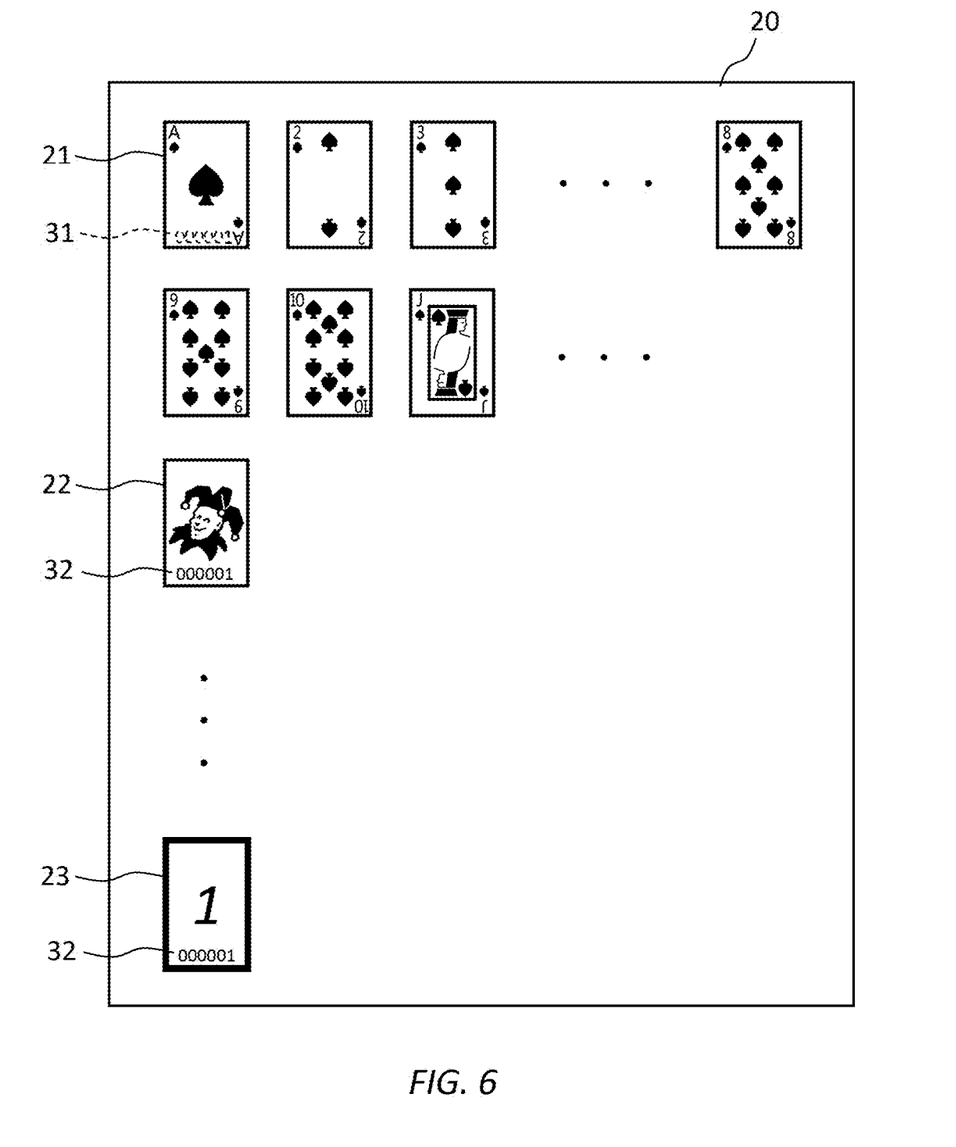
FIG. 6 is a diagram showing a card base sheet used in the method of manufacturing a playing card according to one embodiment, and is a diagram showing a card base sheet on which a sheet ID is printed.

First, the card base sheet 20 having the infrared seeing-through preventing layer 28 as the intermediate layer is prepared. As shown in FIGS. 5 and 6, as a printing process, the printing machine prints the suit 21a and the rank 21b on the front surface of the card base sheet 20, and prints the back pattern 29 on the back surface thereof (step S40). In the present embodiment, the ink containing no carbon is used for printing the suit 21a and the rank 21b. In addition, the ink containing carbon is used for printing the back pattern 29.

In the example shown in FIG. 6, a total of 56 cards including 52 cards 21 including a combination of four suits and 13 ranks, one "joker" card 22, and three other cards 23 are printed in a matrix arrangement of 8 rows×7 columns.

As one modification, as shown in FIG. 7, a total of 105 cards including two decks of 52 cards 21 including a combination of four suits and 13 ranks and one other card 23 may be printed in a matrix arrangement of 7 rows×15 columns.

Next, as a sheet ID assigning step, the process management system assigns different sheet IDs to each card base sheet or the plurality of card base sheets and the printing machine prints the sheet IDs 31 and 32 on the front surface of the card base sheet 20 (step S41). In addition, by the process management system, the sheet IDs 31 and 32 and the printing dates of the sheet IDs 31 and 32 on the card base sheet 20 are stored in the database in association with each other (see FIG. 10). Although not shown in the drawing, the sheet IDs 31 and 32 may be stored in the database in association with one or two or more of a factory name, a manufacturing line, a customer name (casino name).

In the present embodiment, the sheet ID 31 is printed on the card 21 constituting a set of decks with ink (for example, transparent UV ink) invisible to human eyes. As a result, the card 21 constituting the set of decks has the same appearance as a conventional card, and thus the user of the card can use the card without feeling uncomfortable. It should be noted that the sheet ID 31 may be printed only on a specific card (for example, spade A) among the cards 21 constituting the set of decks, or may be printed on all the cards.

On the other hand, the sheet ID 32 is printed on the cards 22 and 23 other than the card constituting the set of decks with ink (for example, black ink) visible to human eyes. As a result, when the manufacturer can easily confirm the sheet ID when inspecting the quality of the printed card base sheet.

In the present embodiment, the sheet ID assigning process (step S41) is performed after the printing process (step S40), but the present embodiment is not limited thereto, and the printing process (step S40) may be performed after the sheet ID assigning process (step S41).

Next, the card base sheet 20 having undergone the printing process (step S40) and the sheet ID assigning process (step S41) is cut into individual cards 21, 22, and 23 by the cutting machine (step S42). By removing cards 22 and 23 other than the cards constituting the set of decks from the cut card, the playing card 21 corresponding to one deck (corresponding to two decks from the card base sheet 20 shown in FIG. 7) is produced.

The sheet ID 31 is read from the playing card 21 constituting the set of decks by the process management system before being shuffled or during being shuffled by the shuffle machine to be described later and is stored in the database in association with the shuffle machine (or shuffle machine group) and shuffled date and time (see FIG. 10).

Next, as the shuffling process, the plurality of decks (for example, four decks or eight decks) of playing card 21 are shuffled by the shuffle machine, and the set of shuffled playing cards 12 is produced (step S43). As the shuffle machine, for example, the shuffle machine described in WO 2009/069708 A can be used.

Next, the set of shuffled playing cards 12 which has undergone the shuffling process (step S43) is packaged by a packaging machine (step S44). In the present embodiment, as shown in FIG. 8, the set of shuffled playing cards 12 is housed in the box-shaped package 11. The material of the package 11 is not particularly limited, and may be paper or a resin film. As shown in FIG. 7, the lid of the package 11 is sealed with the seal 13.

Next, different shuffled playing card IDs are generated for each set of shuffled playing cards by the process management system, and the shuffled playing card ID 13a is assigned to the set of shuffled playing cards 12 as the ID code (step S45). In the shown example, the shuffled playing card ID 13a is encoded as the bar code and is printed on the seal 13 sealing the lid of the package 11 by the printing machine.

In the shown example, in addition to the shuffled playing card ID 13a, a specification table 13b is printed on the seal 13. For example, arbitrary information such as a manufacturing number, a product number, a product name, a color, and a manufacturing date of the shuffled playing card is described in the specification table 13b.

Further, by the process management system, the sheet ID 31 read from the playing card 21 constituting the set of decks before the shuffling process (step S43) is stored in the database in association with the shuffled playing card ID 13a of the set of shuffled playing cards 12 to which the deck belongs (see FIG. 10). In the shown example, the set of shuffled playing cards 12 are configured from the playing cards 21 corresponding to four decks, and four sheet IDs 31 are stored in the database in association with each shuffled playing card ID 13a. In addition, by the process management system, in the database, the shuffled playing card ID 13a and the shuffle machine ID and the shuffle date which specify the shuffle machine or the shuffle machine group shuffling the shuffled playing card 12 are stored in the database in association with each other.

According to the present embodiment, as shown in FIG. 1, since the card base sheet 20 is provided with the infrared seeing-through preventing layer 28 containing the carbon as the intermediate layer, the infrared rays radiated from the printed part on the front side of the card are absorbed by the intermediate layer 28, and hardly transmit the back side of the card. In addition, since the ink containing no carbon is used to print the suit 21a and the rank 21b, a difference between intensity of infrared rays radiated from the printed part and intensity of infrared rays radiated from an area therearound is small. Thus, it is extremely difficult to distinguish the suit 21a and the rank 21b from a distribution of a trace amount of transmitted infrared rays even if there are the infrared rays radiated from the printed part on the front side of the card and the infrared rays transmitting the back side of the card without being absorbed by the intermediate layer 28. Therefore, it is possible to provide a playing card 2 capable of making it difficult to see through the printed part on the front side even when the printed part on the front side is viewed through the infrared camera.

In addition, according to the present embodiment, since the back pattern 29 on the back surface of the card base sheet 20 is printed with the ink containing carbon, as shown in FIG. 2, the distribution of the infrared rays having the same pattern as the back pattern 29 appears on the back side of the card. Therefore, even if there are the infrared rays radiated from the printed part on the front side and the infrared rays transmitting the back side of the card without being absorbed by the intermediate layer 28, the distribution of the trace amount of transmitted infrared rays is buried by overlapping the distribution of the infrared rays radiated from the back pattern 29 of the card, so it is even more difficult to distinguish the printed part on the front side of the card even when the playing card is viewed through the infrared camera.

In addition, according to the present embodiment, since the predetermined sets of playing cards 2 described above are shuffled by the shuffle machine to form a set of shuffled playing cards 12 and a set of shuffled playing cards 12 is packaged and sealed individually, it is possible to provide a shuffled playing card which need not be shuffled by a game sponsor over a long period of time prior to a game and does not provide any room to perform fraudulent acts such as inserting and removing cards and replacing cards.

In addition, according to the present embodiment, since different shuffled playing card IDs 13*a* are individually assigned, as ID codes, to the shuffled playing card 12 individually packaged and sealed, for example, as shown in FIG. 10, if the shuffled playing card ID 13*a* is associated with information that can specify the shuffle machine or the shuffle machine group shuffling the shuffled playing card 12, when it is conceived that there is any defect in the playing card and the shuffle machine is a cause of the defect, it is possible for a manufacturer to easily specify in which shuffle machine or shuffle machine group the defect occurs, thereby making it possible to take countermeasures as soon as possible.

In addition, according to the present embodiment, since the card base sheet 20 on which the different sheet ID 31 are printed for one card base sheet 20 or each of the plurality of card base sheets 20 is cut to produce the playing card of one deck or a plurality of decks, it is possible to confirm, on the database, the information on when the card is printed and also when the card is inspected by tracing back through the distribution history of the playing card 21. As a result, it is possible to confirm whether the playing card is a genuine product correctly manufactured and distributed by reading the sheet ID 31 from the contents of the card to confirm the history on the database in units of sheet even if the contents of the packaged shuffled playing card 12 are replaced with a set of cards whose arrangement is known by malicious fraudulent players.

In addition, by printing different sheet IDs 31 for each card base sheet 20 or the plurality of card base sheets 20, the ID management of the card base sheet 20 in the factory becomes possible. For example, even when the card base sheet 20 is discarded halfway, it is possible to manage at which step the playing card is discarded in the database. In this way, it is possible to grasp a yield in each process at the manufacturing stage. In addition, it will be able to be understood whether the card of the card base sheet which is determined to be defective in each process and thus discarded is inadvertently mixed in goods (that is, it will be able to be understood whether only cards of good card base sheet are used for goods). In addition, even if malicious fraudulent players illegally obtain the discarded card base sheet 20 and cut the obtained card base sheet by themselves to produce a counterfeit card and bring the produced counterfeit card for use in a game, the sheet ID 31 is read from the card to confirm the history on the database, thereby making it possible to easily detect that the playing card is a counterfeit card and enhance the security of the game.

In addition, in the above-described embodiment, in the sheet ID assigning step, as shown in FIGS. 6 and 7, the sheet IDs 31 and 32 are printed on a part of the card base sheet 20 on which the cards 21 to 23 are printed, but the present embodiment is not limited thereto, and the sheet ID may also be printed on a part of the card base sheet 20 on which the card is not printed. In this case, it is possible to acquire the sheet ID from the remaining part (so-called punching scrap) after removing the cards 21 to 23 from the card base sheet 20.

In addition, in the above-described embodiment, (1) in addition to the fact that the card base sheet 20 has the infrared seeing-through preventing layer 28 as the intermediate layer, (2) the ink containing no carbon is used to print the suit 21*a* and the rank 21*b*, (3) furthermore, the back pattern 29 on the back surface of the card base sheet 20 is printed with the ink containing carbon, but (1) in addition to the fact that the card base sheet 20 has the infrared seeing-through preventing layer 28 as the intermediate layer, (2) when the ink containing no carbon is used to print the suit 21*a* and the rank 21*b*, (3) the back pattern 29 on the back surface of the card base sheet 20 is not necessarily printed with the ink containing carbon, and the back pattern 29 may also be printed with the ink containing no carbon.

(1) In addition to the fact that the card base sheet 20 has the infrared seeing-through preventing layer 28 as the intermediate layer, (3) when the back pattern 29 on the back surface of the card base sheet 20 is printed with the ink containing carbon, (2) the ink containing no carbon is not necessarily used to print the suit 21*a* and the rank 21*b*, and the ink containing carbon may also be used to print the suit 21*a* and the rank 21*b*. Even in such an aspect, (1) since the card base sheet 20 is provided with the infrared seeing-through preventing layer 28 containing carbon as the intermediate layer, the infrared rays radiated from the front side of the card is absorbed by the intermediate layer 28 and hardly transmit the back side thereof, (3) furthermore, since the back pattern 29 of the card is printed with the ink containing carbon, the distribution of the infrared rays having the same pattern as the back pattern 29 appears on the back side of the card. Therefore, even if there are the infrared rays radiated from the printed parts 21*a* and 21*b* on the front side and the infrared rays transmitted on the back side without being absorbed by the intermediate layer 28, the distribution of the trace amount of transmitted infrared rays is buried by overlapping the distribution of the infrared rays radiated from the back pattern 29 of the card, so it is extremely difficult to distinguish the suit 21*a* and the rank 21*b* from the distribution of the infrared rays. Therefore, even in the aspect, it is possible to provide a playing card capable of making it difficult to see through the printed part on the front side even when the playing card is viewed through the infrared camera.

Further, (2) the ink containing no carbon is used to print the suit 21*a* and the rank 21*b*, and (3) furthermore, when the back pattern 29 on the back surface of the card base sheet 20 is printed with the ink containing carbon, (1) the card base sheet 20 does not necessarily have the infrared seeing-through preventing layer 28 as the intermediate layer, and the card base sheet 20 may not have the infrared seeing-through preventing layer 28 as the intermediate layer. Even in the aspect, since (2) the ink containing no carbon is used to print the suit 21*a* and the rank 21*b*, the difference between intensity of infrared rays radiated from the printed part and intensity of infrared rays radiated from an area therearound is small. For example, it is extremely difficult to distinguish the suit 21*a* and the rank 21*b* from a distribution of a trace amount of transmitted infrared rays even if there are the infrared rays radiated from the printed part on the front side of the card and the infrared rays transmitting the back side of the card. In addition, since the back pattern 29 of the card is printed with the ink containing carbon, the distribution of the infrared rays having the same pattern as the back pattern 29 appears on the back side of the card. Therefore, even if there are the infrared rays radiated from the printed part on the front side and the infrared rays transmitting the back side, the distribution of the trace amount of transmitted infrared rays is buried by overlapping the distribution of the infrared rays radiated from the back pattern 29 of the card, so it is extremely difficult to distinguish the suit 21a and the rank 21b from the distribution of the infrared rays. Therefore, even in the aspect, it is possible to provide a playing card capable of making it difficult to see through the printed part on the front side even when the playing card is viewed through the infrared camera.

Figure 11A:
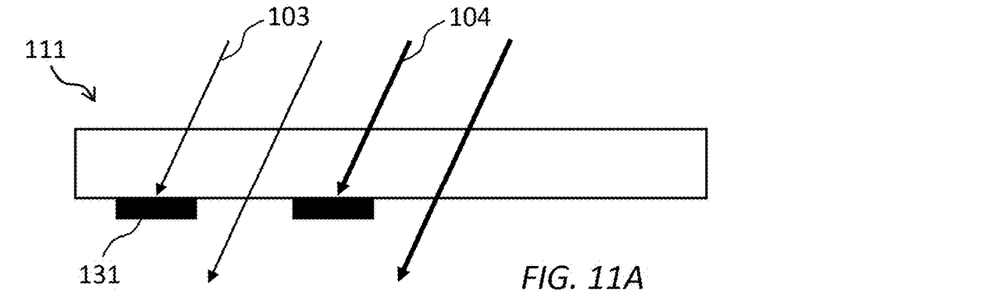
FIG. 11A is a diagram showing a cross section of a conventional playing card.

FIG. 11A is a diagram showing a cross section of a conventional playing card 111. Since visible rays 103 and infrared rays 104 transmit the conventional playing card 111, there was a problem in that it is possible to distinguish printing 131 indicating a rank or a suit from the back surface.

Figure 11B:
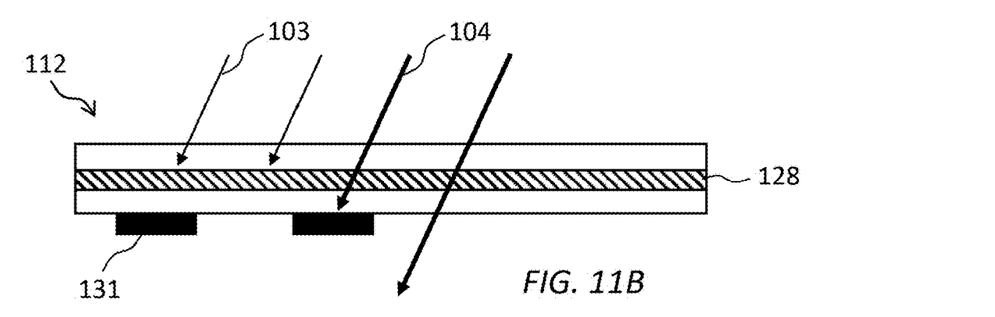
FIG. 11B is a diagram showing a cross section of a playing card having an intermediate layer added to the conventional playing card.

FIG. 11B is a diagram showing a cross section of a playing card 112 having an intermediate layer 128 added to the conventional playing card 111. The playing card 112 includes the intermediate layer 128 having a black layer or a color layer similar to black to prevent the transmission of the visible rays 103 and make it difficult for the visible rays 103 to distinguish the printing 131 indicating the rank or the suit from the back surface. However, since the infrared rays 104 have a strong transmitting force and transmit the intermediate layer 128, there was a problem in that the printing 131 indicating the rank or the suit still can be distinguished from the back surface by using the infrared rays 104.

Figure 11C:
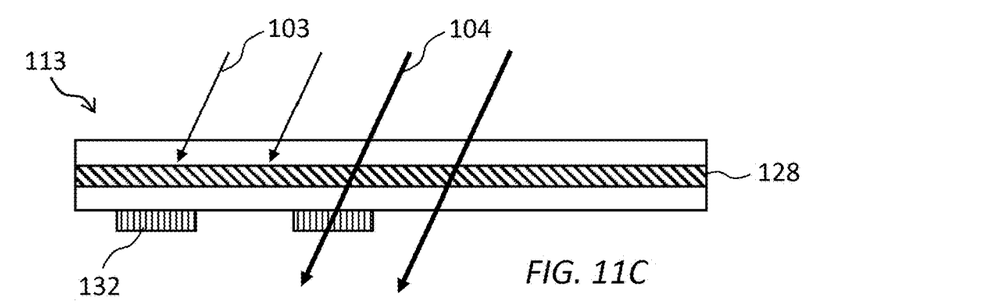
FIG. 11C is a diagram showing a cross section of a playing card according to an embodiment.

FIG. 11C is a diagram showing a cross section of a playing card 113 according to an embodiment. The playing card 113 according to the present embodiment includes the intermediate layer 128 having the black layer or the color layer similar to black, and furthermore, the ink containing no carbon is used for printing 132 indicating a rank or a suit. First, the playing card 112 includes the intermediate layer 128 having a black layer or a color layer similar to black to prevent the transmission of the visible rays 103 and make it difficult for the visible rays 103 to distinguish the printing 132 indicating the rank or the suit from the back surface. The infrared rays 104 transmit the intermediate layer 128, but furthermore, the ink containing no carbon is used for the printing 132 indicating the rank or the suit, so the infrared rays 104 transmit the printing 132 indicating the rank or the suit and it is difficult for even the infrared rays 104 to distinguish the printing 132 indicating the rank or the suit from the back surface. As described above, in the playing card 113 according to the present embodiment, it is difficult for both of the visible rays 103 and the infrared rays 104 to distinguish the printing 132 indicating the rank or the suit from the back surface.

Figure 11D:
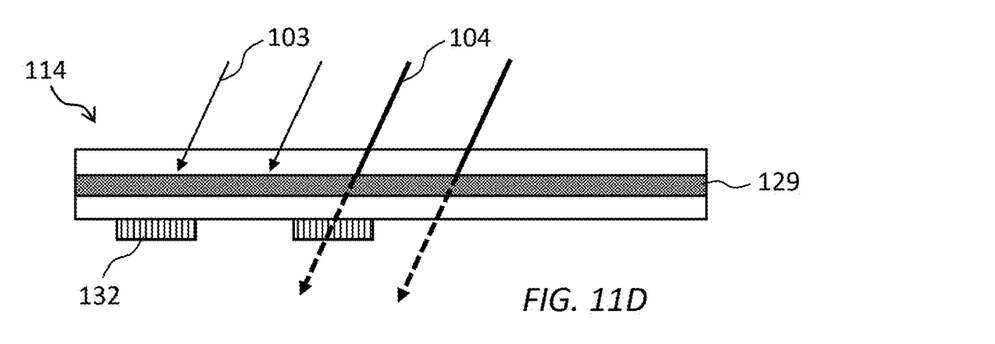
FIG. 11D is a diagram showing a cross section of a playing card according to another embodiment.

FIG. 11D is a diagram showing a cross section of a playing card 114 according to another embodiment of the present invention. The playing card 114 according to another embodiment includes an intermediate layer 129 having a black layer or a color layer similar to black, and furthermore, the ink containing no carbon is used for the printing 132 indicating the rank or the suit. In addition, the intermediate layer 129 contains carbon. The intermediate layer 129 having the black layer or the color layer similar to black prevents the transmission of the visible rays 103, and the intermediate layer 128 containing the carbon reduces the transmission amount of the infrared rays 104. The infrared rays 104 do not completely stop at the intermediate layer 129 and some of the infrared rays transmit the intermediate layer 129, but furthermore, the ink containing no carbon is used for the printing 132 indicating the rank or the suit, so the infrared rays 104 transmit the printing 132 indicating the rank or the suit and it is difficult for even the infrared rays 104 to distinguish the printing 132 indicating the rank or the suit from the back surface. As described above, the playing card 114 of another embodiment of the present invention further reduces the amount of the infrared rays 104 transmitting the intermediate layer 129 than the playing card 113, so it is difficult for both of the visible rays 103 and the infrared rays 104 to distinguish the printing 132 indicating the rank or the suit from the back surface.

The above-described embodiments are described for the purpose of enabling those skilled in the art to which the present invention belongs to implement the present invention. Various modifications of the above embodiments are obvious to those skilled in the art, and the technical idea of the present invention can be applied to other embodiments. Accordingly, the present invention is not limited to the embodiments described, but should be the broadest scope in accordance with the technical idea defined by the claims. The constituent elements of the above-described embodiments and individual modifications can be arbitrarily combined without departing from the gist of the invention.

What is claimed:

1. A playing card, comprising:
   a first layer on which a suit and a rank are printed entirely with a substantially carbon free ink such that the printed suit and rank transmit infrared rays;
   a second layer on a surface of which a pattern is printed; and
   an intermediate layer arranged between the first and second layers and having a dark color that impedes transmission of visible rays between the first and second layers, thereby obscuring visibility, from the surface of the second layer, of the suit and the rank printed on the first layer.

2. The playing card according to claim 1, wherein the pattern is printed by an ink containing carbon that impedes visibility, from the surface of the second layer, of the suit and the rank printed on the first layer based on the infrared rays.

3. The playing card according to claim 1, wherein the intermediate layer additionally impedes transmission of the infrared rays to the surface of the second layer on which the pattern is printed.

4. The playing card according to claim 1, wherein the playing card is one of a plurality of cards of one or more decks of cards cut by a cutting machine from a card base sheet formed of the first, second, and intermediate layers.

5. A set of shuffled playing cards formed of a plurality of playing cards that are shuffled by a shuffle machine, wherein each of the shuffled playing cards of the set comprises:
   a first layer on which a suit and a rank are printed entirely with a substantially carbon free ink such that the printed suit and rank transmit infrared rays;
   a second layer on a surface of which a pattern is printed; and
   an intermediate layer arranged between the first and second layers and having a dark color that impedes transmission of visible rays between the first and second layers, thereby obscuring visibility, from the surface of the second layer, of the suit and the rank printed on the first layer.

6. A table game system, comprising:
   a playing card having one surface on which a suit and a rank are printed entirely with a substantially carbon free;
   a game table on which a game can be played using the playing card; and
   a card distributer, wherein the card distributer is configured to:
      withdraw a plurality of playing cards, including the playing card, one card at a time onto the game table;

read a code on the one surface of the playing card, the code being printed of an invisible ink; and
determine and display a win or loss result of the game based on the read rank.

7. The set of shuffled playing cards according to claim 5, wherein the intermediate layer additionally impedes transmission of the infrared rays to the surface of the second layer on which the pattern is printed.

8. A table game system, comprising:
a playing card having one surface on which a suit and a rank are printed entirely with a substantially carbon free ink;
a game table on which a game can be played using the playing card; and
a card distributer, wherein the card distributer is configured to:
withdraw a plurality of playing cards, including the playing card, one card at a time onto the game table;
read a code on the one surface of the playing card, the code being printed of an invisible ink; and
determine and display a win or loss result of the game based on the read rank.

* * * * *